United States Patent [19]

Ash et al.

[11] Patent Number: 4,666,777

[45] Date of Patent: May 19, 1987

[54] STRUCTURED LATEX CORE-SHELL POLYMER PARTICLES SUITABLE FOR USE IN THE PREPARATION OF COMPOSITE SHEETS

[75] Inventors: Mary L. Ash; Do I. Lee, both of Midland; Carl H. Frick, Mt. Pleasant, all of Mich.

[73] Assignee: The Dow Chemical Company, Midland, Mich.

[21] Appl. No.: 812,615

[22] Filed: Dec. 23, 1985

[51] Int. Cl.$^4$ .......................... C08K 5/34; C08K 5/13; B32B 27/08

[52] U.S. Cl. ..................................... 428/407; 525/902

[58] Field of Search ....................... 428/407; 525/902

[56] References Cited

U.S. PATENT DOCUMENTS 4,264,678 4/1981 Nelsen et al. ....................... 428/407

4,419,471 12/1983 Nelsen et al. ....................... 525/902

*Primary Examiner*—William J. van Balen

[57] ABSTRACT

A structured latex polymer particle suitable for use in the preparation of a wet-laid composite sheet having good wet-end and end-use properties. The structured latex particle has a core region comprising from about 10 to about 40 percent of the total polymer particle volume and a shell region comprising from about 60 to about 90 percent of the total polymer particle volume and comprising a vinyl acid. The core region is prepared to have good end-use properties as measured by tensile and elongation and the shell region is prepared to have good wet-end properties as measured by deposition and drainage time. The subject structured latex polymer particles are thus advantageously employed in the preparation of composite sheets of all types to thus form an economical and high quality composite sheet.

7 Claims, No Drawings

STRUCTURED LATEX CORE-SHELL POLYMER PARTICLES SUITABLE FOR USE IN THE PREPARATION OF COMPOSITE SHEETS

BACKGROUND OF THE INVENTION

The preparation of wet-laid composite sheets is generally well known in the art. A composite sheet material can be of a cellulose, polymeric or other fibrous material product prepared by methods as outlined in U.S. Pat. Nos. 4,225,383; 4,189,345 and 4,187,142. The techniques for manufacturing composite can include an aqueous wet-laid method or a beater addition process for converting fibers into a sheet or paper material.

Typically, a latex is employed as a binder in the preparation of a composite sheet for two roles. The first is a wet-end role wherein the latex assists in the preparation of the composite sheet into a unitary mass. The second is an end-use role wherein the physical properties of the latex are contributed to the overall properties of the sheet.

Wet-end characteristics are important to the efficient preparation of composite sheets while end-use characteristics are important to the final properties of the composite sheet. Unfortunately, a latex which has good wet-end properties may not yield good end-use properties. For example, optimization of the wet-end properties of deposition time and drainage time will usually result in a final product having low end-use properties such as tensile strength. On the other hand, optimization of tensile strength can lead to poor drainage time and deposition time. Therefore, it would be desirable to prepare a single latex composition having both good wet-end and end-use properties for the preparation of wet-laid composite materials.

One solution is to blend various latexes especially designed for wet-end properties and end-use properties. However, this would involve the addition of at least two latexes to the aqueous slurry for preparing a composite sheet, which carries inherent problems of limited drain time and strength. Also, employing more than one latex would involve extra preparation, handling and storage.

Another solution to preparing a latex having both good wet-end and end-use properties is to copolymerize various monomers together; however, this is not always satisfactory because the wet-end properties are predominantly affected by the surface chemistry of the latex polymer particles and the softness of the latex polymer particles. Thus, the mere copolymerization of various monomers would not allow one to adjust the wet-end properties independently from the end-use properties which depend largely on the hardness of the polymers.

The subject invention is directed toward the preparation of structured latex particles having a shell/core morphology whereby the wet-end and end-use properties are optimized. Structured latex polymer particles are generally known in the art as demonstrated by U.S. Pat. Nos. 4,017,442; 4,156,669 and 4,325,856. It has now been discovered that, by careful adjustment of structured latex polymer particle parameters, a binder can be formed having good wet-end and end-use properties for composite sheets.

SUMMARY OF THE INVENTION

The present invention is directed toward a structured latex polymer particle suitable for use in the preparation of a wet-laid composite sheet having both good wet-end and end-use properties. The polymer particle is prepared such that it comprises from about 10 to about 40 percent of the total particle volume of a core region having a $T_g$ of from about 20° to about 120° C., and from about 60 to about 90 percent of the total polymer particle volume of a shell region having a $T_g$ of from about 10° to about −90° C. and comprising a vinyl acid. Preferably, the vinyl acid content is less than about 5 percent by total weight of the shell region.

In one preferred embodiment, the structured latex particle has a core region comprising styrene or copolymers thereof. More particularly, the core region of the subject structured latex polymer particle comprises from about 15 to about 30, more preferably from about 18 to about 22 percent of the total polymer particle volume and the shell region comprises from about 85 to about 70, more preferably from about 82 to about 78 percent of the total polymer particle volume. More preferably, the vinyl acid content of the shell region is from about 1 to about 3 percent by total weight of the shell region. In addition, the shell region can comprise a strong acid group in an amount of less than about 2 percent by total weight of the shell region.

The structured latex polymer particles of the subject invention are ideally suited for the preparation of a wet-laid composite sheet. Advantageously, the structured latex particles provide good wet-end and end-use properties such that the composite sheet will not only be conveniently and economically prepared but will have good final physical properties.

DETAILED DESCRIPTION OF THE INVENTION

The present invention is a structured latex polymer particle having good wet-end and end-use properties. The structured latex has a core/shell morphology where the shell region is prepared such that the wet-end properties are optimized, i.e., good drainage time and deposition time. The core region is prepared such that the end-use properties are optimized, i.e., sufficient strength to satisfy the end-use properties desired of the composite sheet.

The subject structured latex polymeric particles have a core/shell morphology wherein the core region comprises from about 10 to about 40 percent, preferably from about 15 to about 30 percent of the total polymer particle volume and the shell comprises from about 60 to about 90 percent, preferably from about 70 to about 85 percent of the total polymer particle volume. More preferably, the core region is from about 18 to about 22 percent and the shell is from about 78 to about 82 percent of the polymer particle's total volume.

The volumes of shell and core region are important for obtaining the good wet-end and end-use properties. A larger core will affect the shell surface chemistry and thus hamper the wet-end properties, while a smaller core will diminish the effect of the core polymers such that the end-use properties are reduced. Thus, the above ranges represent an optimization for best wet-end and end-use properties.

The core region is essentially surrounded by the shell region while the interface between the regions can be abrupt or gradual. This is, of course, dependent on the manner of preparation. The core region generally comprises polymer which is non-film forming at ambient, preferably having a $T_g$ (glass transition temperature) of greater than 20° to about 120° C. More preferably, the core region polymer is chosen to provide the desired end-use characteristics for the composite sheet as defined by the physical properties, i.e., tensile and elongation.

Typical core polymers can comprise styrene and copolymers thereof or other polymers having similarly high $T_g$'s, for example polyvinylidene chloride, polyvinyl chloride, polyvinyl toluene, α-methylstyrene and copolymers thereof. Copolymers of sufficient hardness can be prepared with comonomers of ethyl acrylate, butyl acrylate, butadiene or isoprene with hard monomers such as styrene, vinyl chloride, vinyl toluene, α-methylstyrene or vinylidene chloride.

The shell region of the subject structured latex polymer particle essentially surrounds the aforementioned core region. The shell comprises polymer which is film forming at ambient, preferably having a $T_g$ of from about 10° to about −90° C. Representative shell polymers can include butadiene, vinyl acetate, acrylate and isoprene polymers or copolymers thereof provided they are still film forming at ambient. Alternatively, plasticizers can be employed with the shell polymer or copolymer to make them film forming at ambient. More preferably, the shell region polymer is prepared to provide good wet-end properties with respect to deposition and drain times.

Two important variables for adjusting the wet-end properties are the monomer ratio and the vinyl acid content. For example, for a styrene/butadiene copolymer, the rate of water removal is improved by increasing the proportion of butadiene and decreasing the amount of vinyl acid in the copolymer. The copolymer ratios are preferably adjusted to maintain a $T_g$ as defined above for the shell region.

The vinyl acid content of the shell region is important to optimize the rate of drainage. Generally, a vinyl acid content of less than about 5 percent by total weight of the shell polymer is sufficient to provide satisfactory drain rates. More preferably, a vinyl acid content of from about 1 to about 3 percent by total weight of the shell polymer is employed. Representative vinyl acids include itaconic acid, fumaric acid, maleic acid, acrylic acid, methacrylic acid or other carboxylic acids copolymerizable with the shell monomers.

In addition, a minor amount of a strong acid group can be included in the shell polymer to improve the wet-end properties. The strong acid component or group is understood to have an effect on the deposition time of a wet-laid composite. A minor amount thereby reduces the deposition time while an increase in the amount of strong acid lengthens the deposition time. A minor amount is in the range of less than about 2 percent, preferably less than about 1 percent by total weight of the polymer comprising the shell region. Generally, this group can be provided by means of the free radical initiator employed in the polymerization. Typical initiators are, for example, ammonium persulfate, sodium persulfate, or strong peroxyacids.

The manner in which the structured latex particles of this invention are prepared is not particularly critical, so long as the hereinbefore described compositional parameters are satisfied. Thus, for example, the latex can be prepared by encapsulating dispersed polymer particles of a pre-existing core polymer or copolymer with a polymeric shell portion. The latexes can also be prepared by a staged addition of monomers, i.e., each monomer feed individually added and polymerized to form one region of the polymer particle prior to the addition of the remaining monomer feeds to form the other region of the polymer particle. In yet another aspect, the structured polymeric particle can be prepared by a continuous feed process. The continuous feed process involves the incremental addition of the monomer feeds such that, as one monomer feed is reduced, the subsequent monomer feed is increased to provide a smooth transition between various monomer feeds.

The polymerization process can be conducted pursuant to conventional emulsion polymerization techniques.

Thus, for example, the monomers to be employed for the particular region to be prepared are typically dispersed with agitation sufficient to emulsify the mixture in an aqueous medium which may contain known emulsifying agents (i.e., surfactants) as well as other ingredients conventionally employed in the art as polymerization aids (e.g., conventional chain transfer agents, etc.). Such monomers are then subjected to polymerization with the aid of a conventional source for generating free radicals, such as conventional free radical polymerization catalyst, activating radiation, etc.

Optionally, conventional seeding procedures can be employed in the first stage polymerization to aid in the control of polymerization and to achieve the desired average particle size and particle size distribution for the dispersed copolymer particles. Also, as has been noted, conventional chain transfer agents can be employed in the practice of the present invention and, indeed, in polymerization stages employing aliphatic conjugated dienes it is preferable to do so. Examples of such conventional chain transfer agents include bromoform, carbon tetrachloride, organic mercaptans (e.g., dodecylmercaptans, etc.), or other known chain transfer agents. Conventional amounts in general, from about 0.1 to about 10 weight percent based on total monomer charge of such chain transfer agents are typically employed. In addition, it is sometimes desirable to have small amounts of certain known additives incorporated into the latex. Typical examples of such additives are surfactants, bacteriocides, neutralents, anti-foamers, antioxidants, etc. Such additives can be incorporated into the latex of the invention in a conventional manner and at any convenient point in the preparation of such latexes.

EXAMPLE I

A series of latexes were prepared for use in the preparation of a composite sheet. The polymer composition and morphology of each were as follows. All amounts are in parts per one hundred parts total polymer unless otherwise indicated.

The Control Latex was a homogeneous latex of 61 parts styrene, 38 parts butadiene and 1 part itaconic acid. This composition was employed because it has good deposition and drain time when employed in the preparation of a composite sheet. Unfortunately, the Control Latex did not exhibit good tensile properties which was expected because the latex was designed for good wet-end properties.

The Control Latex was modified by adding 4 additional parts of styrene in an attempt to increase tensile strength. This latex was identified as Control Latex "A".

In addition, another modified Control Latex was prepared having 4 additional parts of styrene and 0.25 parts of the vinyl acid component removed in an attempt to balance the wet-end and end-use properties.

This was identified as Control Latex "B". The Control and modified Control Latexes "A" and "B" were all homogeneous polymer latexes in morphology.

Finally, a structured latex particle of the subject invention was prepared having a styrene polymer core region and a shell region consisting of the Control Latex composition. Thus, the core region was designed for good tensile and the shell region was designed for good deposition and drain time properties. The core region was prepared such that it comprised 19 percent of the total polymer particle by volume and the shell region was overpolymerized on the core and comprised the remaining volume.

Each of the latexes was employed in the preparation of a composite sheet and the wet-end and end-use properties for each was measured and are shown below in Table I.

TABLE I

| Latex | Drain Time (sec) | Room Temp. Tensile (pli) | 350° F. Tensile (pli) | Taber[1] Stiffness (Taber Units) |
|---|---|---|---|---|
| Control* | 14 | 38 | 15 | 83 |
| Control A* | 45 | — | — | — |
| Control B* | 18 | 47 | 16 | 61 |
| Structured Latex | 13 | 65 | 20 | 139 |

*Not an example of the invention, homogeneous polymer particles.
[1]Taber stiffness is a test designed and developed to evaluate the stiffness and resilient qualities of flexible materials and is conducted according to the standardized TAPPI T 489 os-76 test method.

Table I indicates that modifications to the Control Latex which had very good wet-end properties (drain time) did not improve the end-use properties (tensile and stiffness) without a corresponding loss of wet-end properties. For instance, increasing the styrene level of Control "A" dramatically increased drain time while reducing the vinyl acid in Control "B" brought the drain time back down. However, this had a poor effect on tensile and stiffness. Only the Structured Latex of the subject invention provided good wet-end and end-use properties. This demonstrates that the particular composition and morphology of the Structured Latex takes advantage of the good wet-end properties of the shell region and the high tensile contribution of the core region.

EXAMPLE II

Structured latex particles having various shell/core ratios were prepared to determine the effect of core size on maintaining good wet-end and end-use properties. A homogeneous Control Latex was also prepared for comparison purposes having 61 parts styrene, 38 parts butadiene and 1 part itaconic acid. This Control Latex was similar to the Control of Example I and exhibited good wet-end properties.

The structured latex polymer particles were prepared with styrene core regions of varying percentages (19, 24 and 29 percent) of the total volume of the particle and the remainder of the particle, the shell region, comprised a composition consisting essentially of the Control Latex. The latexes were used to prepare composite sheets and the wet-end and end-use properties of the sheets were measured and are recorded below in Table II.

TABLE II

| Latex | Drain Time (sec.) | Room Temp. Tensile (pli) | 350° F. Tensile (pli) | Taber Stiffness[1] (Taber Units) |
|---|---|---|---|---|
| Control* | 14 | 37 | 15 | 83 |
| Structured Latex | | | | |
| 19 percent core | 13 | 60 | 20 | 139 |
| 24 percent core | 13 | 58 | 19 | 144 |
| 29 percent core | 30 | 53 | 14 | 149 |

*Not an example of the invention, homogeneous polymer particles.
[1]Taber stiffness is a test designed and developed to evaluate the stiffness and resilient qualities of flexible materials and is conducted according to the standardized TAPPI T 489 os-76 test method.

Table II demonstrates that increasing the core size had an effect on the wet-end properties of the latex in that the drain time was lengthened. However, 30 seconds is not completely undesirable in view of the very good end-use properties achieved. Meanwhile, the two smaller core volumes gave better drain time and still maintained good end-use properties. Thus, Example II demonstrates that a single latex can be prepared having both good wet-end and end-use properties when the basic structural parameters, as outlined above, are followed. Example II also demonstrates the criticality of the core/shell volumes in balancing the wet-end and end-use properties.

What is claimed is:

1. A structured latex polymer particle suitable for use in the preparation of a wet-laid composite sheet having good wet-end and end-use properties, said polymer particle comprising:
   (a) from about 10 to about 40 percent of the total polymer particle volume of a core region having a $T_g$ of from about 20° to about 120° C.; and
   (b) from about 60 to about 90 percent of the total polymer particle volume of a shell region having a $T_g$ of from about 10° to about −90° C. and comprising a vinyl acid.

2. The structured latex polymer particle of claim 1 where said vinyl acid component is present in an amount of less than about 5 percent by total weight of said shell region.

3. The structured latex polymer particle of claim 1 where said core region comprises styrene or copolymers thereof.

4. The structured latex polymer particle of claim 1 where said core region comprises from about 15 to about 30 percent of the total polymer particle volume and said shell region comprises from about 70 to about 85 percent of the total polymer particle volume.

5. The structured latex polymer particle of claim 1 where said core region comprises from about 18 to about 22 percent of the total polymer particle volume and said shell region comprises from about 82 to about 78 percent of the total polymer particle volume.

6. The structured latex polymer particle of claim 2 where said vinyl acid content is from about 1 to about 3 percent by total weight of said shell region.

7. The structured latex polymer particle of claim 1 where said shell region additionally comprises a strong acid group in an amount less than about 2 percent by total weight of said shell region.

* * * * *